United States Patent [19]

Verheyden

[11] Patent Number: 4,628,615
[45] Date of Patent: Dec. 16, 1986

[54] PROCESS AND INSTALLATION FOR THE HEAT TREATMENT OF CYLINDRICAL BODIES, ESPECIALLY PIPES

[76] Inventor: Gerardus M. C. Verheyden, P. O. Box 74, NL-6980 ab Doesburg, Netherlands

[21] Appl. No.: 632,450

[22] Filed: Jul. 19, 1984

[30] Foreign Application Priority Data

Jul. 19, 1983 [DE] Fed. Rep. of Germany ....... 3325944

[51] Int. Cl.⁴ .............................................. F26B 3/00
[52] U.S. Cl. .......................................... 34/24; 34/31; 34/105; 34/208; 34/236; 432/11; 432/124
[58] Field of Search ................. 34/21, 24, 31, 66, 104, 34/105, 208, 216, 217, 228, 236; 432/11, 124, 128; 198/346, 561, 779

[56] References Cited

U.S. PATENT DOCUMENTS

| | | | |
|---|---|---|---|
| 2,481,130 | 9/1949 | Lindemuth | 34/105 |
| 2,612,706 | 10/1952 | Simpson et al. | 34/228 |
| 2,708,796 | 5/1955 | Adamy | 34/104 |
| 2,762,321 | 9/1956 | Cook | 34/208 |
| 3,080,157 | 3/1963 | Anthes | 34/208 |
| 3,111,452 | 11/1963 | Ewing et al. | 34/105 |
| 3,198,501 | 8/1965 | Banister et al. | 432/48 |
| 3,430,308 | 3/1969 | Van Alsburg | 34/217 |
| 3,815,881 | 6/1974 | McCann | 432/11 |
| 3,953,247 | 4/1976 | Elhaus et al. | 148/20.3 |
| 4,083,119 | 4/1978 | Yacura | 34/105 |
| 4,142,304 | 3/1979 | Ricci et al. | 34/105 |
| 4,195,418 | 4/1980 | Sturgeon et al. | 34/217 |
| 4,285,669 | 8/1981 | Walchhutter | 34/217 |

FOREIGN PATENT DOCUMENTS

| | | |
|---|---|---|
| 5940 | 12/1979 | European Pat. Off. . |
| 1268318 | 5/1968 | Fed. Rep. of Germany . |
| 2314117 | 1/1977 | France . |
| 2325007 | 4/1977 | France . |
| 1534597 | 12/1978 | United Kingdom . |

Primary Examiner—Albert J. Makay
Assistant Examiner—David W. Westphal
Attorney, Agent, or Firm—Howard M. Ellis; Michael L. Dunn

[57] ABSTRACT

The invention relates to a process and to an installation for the heat treatment of cylindrical bodies, in particular pipes, of ceramic material. During the treatment, the pipes are dried, heated and sintered, and subsequently cooled, in successively arranged chambers.

During transportation through the drying zone, the heating zone and the cooling zone, as well as in heat treatment during sintering, the objects are turned about their own axis independently of the transportation rate, so that they are not only evenly heated, but a possible deformation is also prevented. This type of transportation and heating with possible heat exchange between the individual zones makes possible a rapid heating-up without detriment to the cylindrical bodies, and thus a short design length of the installation. Above all, the sintering zone, which must consist of high-value, ceramic material due to the high temperatures, can be kept very small.

21 Claims, 3 Drawing Figures

PROCESS AND INSTALLATION FOR THE HEAT TREATMENT OF CYLINDRICAL BODIES, ESPECIALLY PIPES

BACKGROUND OF THE INVENTION

The invention relates to a process for the heat treatment of cylindrical bodies, in particular pipes, in particular of ceramic material, which are transported in horizontal position during the heat treatment through various temperature zones and are turned about their own axes at least on that part of the transportation route with the highest temperature.

The invention furthermore relates to an installation for the implementation of such a process, consisting of several, successively arranged chambers having heating devices and transportation means for the transportation of the cylindrical bodies in horizontal position through the chambers.

It is known to heat-treat ceramic pipes in a continuous furnace (European Patent Application No. 0,005,940). The furnace is subdivided into three zones, namely into a preheating zone, a main heating and sintering zone and into a cooling zone. Through the first zone, the pipes are supported on carriers whilst they are transported and dried. In the second zone, in which the ceramic material of the pipes becomes thermoplastic, the pipes are rolled along the floor of the furnace in order both that they are heated evenly over their circumference and that cross-sectional deformation is prevented. In the last zone, the pipes are again borne by supports whilst being transported and cooled.

The heat treatment of the pipes in such furnaces is unfavorable for various reasons. Since heating of the pipes is essentially performed from outside by means of heat radiation from the furance roof and walls of the furnace, but the heat conduction of the pipe wall is poor in the case of most ceramic materials, it takes a relatively long time before the pipes have been brought to the desired temperature right through to the inside. Long treatment times require long furnaces and are therefore unfavorable from heat economy aspects. If it were attempted to roll the pipes along the entire transportation route in order to obtain an even heating or an even cooling over the entire circumference from the outset, there would be the danger that the pipes become axially offset on the furnace floor and run into the walls. Furthermore, in this case the transportation rate would depend on the rotational speed on which even heating directly depends and, thus, with a prescribed duration of stay in the individual zone, determine the length of the treatment zone.

SUMMARY OF THE INVENTION

The invention is based on the object of providing a process and an installation which make the heat treatment of cylindrical, extended bodies possible with greater effectiveness.

This object is achieved in accordance with the process by turning the cylindrical bodies about their own axes during the entire transportation through the individual heating zones at a circumferential speed which is independent of the transportation rate and adequate to ensure even heating and, where applicable, cooling during their stay in the individual zones and to prevent deformation of the bodies, taking into account the temperature-dependent dimensional stability of the bodies.

This object is achieved in accordance with the installation by the transportation means having in the individual zone driven carrier elements with which the bodies can be rotated about their own axes independently of the transportation rate in the respective zone.

Since, in the invention, the bodies to be heated are turned about their own axes during heat treatment, it is ensured that they are heated evenly over their circumference, so that time for a temperature equalization between regions of the circumference heated to a greater or a lesser extent is not required. This makes it possible to carry out heating faster. Faster heating of the bodies allows for a shorter treatment zone. Wherever pipes are to be heat-treated, the heat treatment can be further accelerated by supplying the heat not only from outside, but also from inside. This can occur, for example, by hot air, or cooled air, being blown into the pipes. The blowing in is preferably performed along the transportation route alternately from opposite ends in order to supply the heat as evenly as possible from the inside as well. The heat can, however, also be provided by means of a heating element which can be introduced axially into the pipes. This type of heating up is particularly appropriate in the treatment zone with the highest temperature (sintering zone), in which the pipes are treated whilst stationary but rotating themselves at high speeds to prevent a deformation of the material which is becoming thermoplastic.

According to a further embodiment of the invention, the heat treatment in the temperature zone with the highest temperature is performed in such a way that the treatment temperature of this zone is raised from the temperature at the end of the preceding treatment zone to the desired maximum temperature, and subsequently lowered to the temperature at the start of the following treatment zone. This embodiment of the invention makes it possible to treat the bodies to be heat-treated in a very short zone, which thus requires little thermal energy. A further advantage of such a process consists in the fact that high-value, and therefore expensive, high temperature-resistant, ceramic material is only required for this small temperature zone, while less expensive material, namely normal stainless steel, can be used for the other, larger zones with lower temperatures of up to, for example, max. 800° C.

Although heat treatment of bodies in the temperature zone with the highest temperature and preceding heat treatment zone are maintained at constant temperatures a further embodiment of the invention includes sequential changes in temperatures of the various heating zones. In order to avoid possible damage to the bodies by sudden temperature changes, while transport has stopped bodies are preheated in the heating zone preceding the zone with the highest temperature (sintering zone) so as to raise their temperatures to that of the maximum heating zone. Similarly, after heating up the temperature of the sintering zone it can be lowered to the temperature of the following zone before the body leaves the sintering zone.

According to a further embodiment of the invention, the heat treatment in the temperature zone with the highest treatment temperature is performed in a space sealed off from the preceding and following zones. This embodiment has the advantage that the heat treatment line remains short and no temperature equalization zone is required, which would have to consist of high-value, high temperature-resistant material and would additionally be accompanied by heat loss.

It is advantageous both with respect to the lengths of the transportation routes of the bodies through the zones required for heat treatment and with respect to the heat balance for heat treatment if transportation of the bodies to and from the heat treatment zone with the highest temperature is performed in parallel, in particular one above the other, a heat exchange taking place between the objects of the one transportation line and those of the other, opposing transportation line. Preferably, the heat exchange is performed by means of air conducted past the bodies. This heat exchange is particularly effective above all when the air is conducted past the transportation lines in an opposing flow.

According to a first embodiment of the installation, the transportation means are, in a manner known per se (U.S. Pat. No. 2,481,130), continuous belts or chains with driven support rolls or carrier arms. Not previously known per se in this context is the further embodiment of the invention in which the one side of the belts or of the chain runs through a chamber preceding the treatment zone with the highest temperature, and the other, opposing side of the belt or of the chain runs through a chamber which follows the treatment zone with the highest temperature at a corresponding distance. This embodiment both results in a compact design and creates the possibility of heat exchange between the two chambers with appropriate conductance of the atmosphere in the chambers.

In order to facilitate the transfer of the bodies to be heat-treated from one chamber into the other, chambers arranged successively in the transportation direction can be mutually offset laterally and their transportation means arranged so that they overlap with one another. In this case, the longitudinal bodies transported horizontally in line position can be pushed axially from the transportation means of one chamber onto the transportation means of the other chamber.

Wherever there are several heat treatment zones preceding the zone with the highest temperature, e.g. a drying chamber and a heating chamber upstream of the chamber with the highest temperature and a first cooling chamber and a second cooling chamber downstream of the chamber with the highest temperature, it is particularly advantageous to arrange one above the other the transportation means of the chambers preceding and following the chamber with the highest temperature by an equal distance, because in these zones the temperatures for drying and recooling or heating and first cooling correspond particularly well with respect to heat exchange and the necessary transportation rate.

Since, as already mentioned above, treatment of the bodies is performed in the zone with the highest temperature whilst they are stationary, but it is necessary to transfer the bodies from the level of the preceding transportation device to the level of the following transportation device, a further embodiment of the invention provides for equipping the chamber for treatment at the highest temperature with a hoist apparatus with which the bodies can be transferred from the first level to the other level during heat treatment. This chamber too can be arranged at a mutual offset to the adjoining chamber, corresponding to the offset of the preceding and following chambers, to enable the bodies to be heat-treated to be transferred by axially shifting. It goes without saying that other spatial arrangements between the chambers, with correspondingly fitted transfer devices, are possible within the scope of the invention.

DESCRIPTION OF THE DRAWINGS

An exemplary embodiment of the invention is represented in the accompanied drawings.

DETAILED DESCRIPTION OF THE INVENTION

Figure 1:
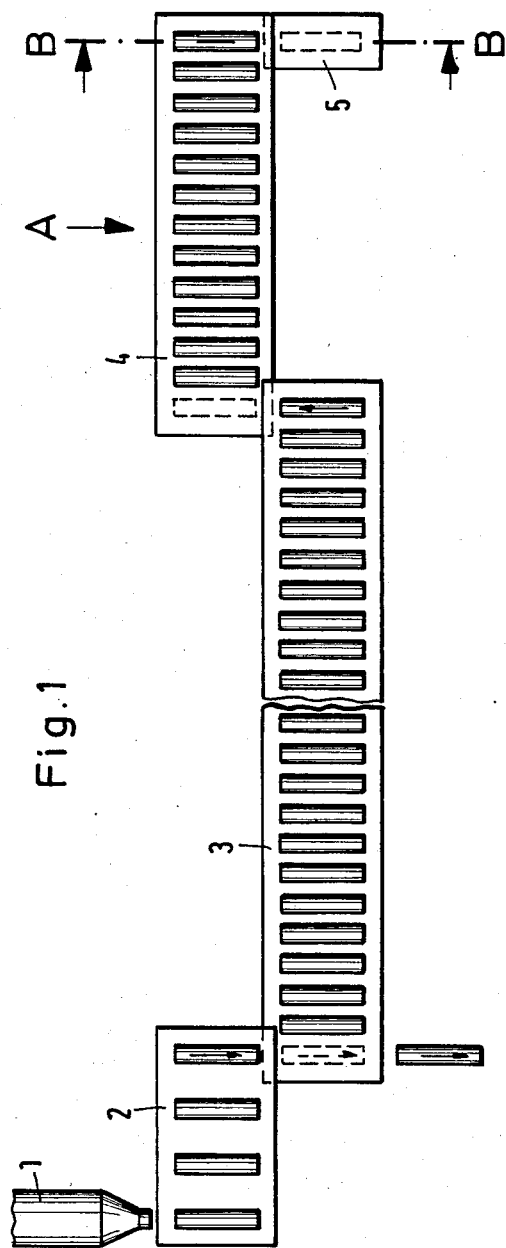
FIG. 1 shows a diagrammatic plan of an installation for the heat treatment of longitudinally, circularly cylindrical, ceramic bodies.

The pipes produced from ceramic material by an extruder 1 are transferred to a combination cutting, shaping and straightening unit 2. This unit 2 is adjoined by a combination drying and cooling chamber 3. The chamber 3 is adjoined by a combination heating and cooling chamber 4, which is in turn adjoined by a main heating or sintering chamber 5. As can be seen from FIG. 1, the unit 2 and the individual chambers 3, 4 and 5 are arranged mutually offset and overlapping one another. In this way it is possible to transfer the objects to be heat-treated 9 by axial shifting from one unit or chamber to the following chamber.

Figure 2:
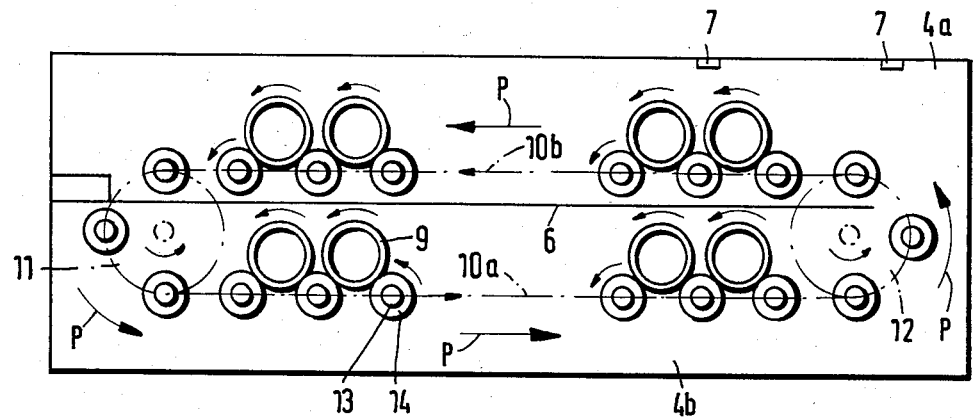
FIG. 2 shows a diagrammatic side view, in the direction of arrow A in FIG. 1, of the chambers directly preceding and following the chamber with the highest treatment temperature

The chambers 3 and 4 have the same structure. They differ only in treatment temperature. It therefore sufficies to describe the structure of chambers 3 and 4 with reference to the example of chamber 4 shown in FIG. 2.

Chamber 4 is subdivided by means of a middle, horizontal partition 6 into an upper subchamber 4a and a lower subchamber chamber 4b. The atmosphere in chamber 4a is heated, for example by gas-powered burners 7. By means of a blower 8, it is possible to circulate the atmosphere through the subchambers 4a and 4b in the direction of arrow P.

For transportation of the pipes to be heated or cooled 9, a transportation device is provided, which transports the pipes 9 translaterally through the subchambers 4a, 4b in a direction opposite to the flow direction of the atmosphere. The transportation device consists of one or more parallel continuous chains 10a, 10b, guided and driven via deflexion pulleys 11, 12. The chain 10a, 10b bears a plurality of driven rolls 13 spaced apart from one another, which are set with a plurality of circular disks 14 of equal size and arranged at intervals. The circular disks 14 of neighboring rolls in each case carry one pipe 9 in place of these driven carrying elements 13, 14, the chains 10a, 10b could also bear driven cantilever arms which projects axially into the pipes 9. In any case, the area supported by the carrying elements is small. The structure and drive of the described transportation means is known per se from U.S. Pat. No. 2,481,130. In the side walls of chamber 4, in the region of the transportation level of the pipes 9, blowers can be provided, which blow hot air or cooled air into the pipes alternately from opposite ends during transportation of the pipes 9. This has the effect that the pipes are subjected to heat not only from outside by the atmosphere and radiation of the walls and roof of the chamber, but also from inside. This type of heat supply ensures a rapid and, in combination with rotation of the pipes 9 themselves, even heating of the pipes 9.

Figure 3:
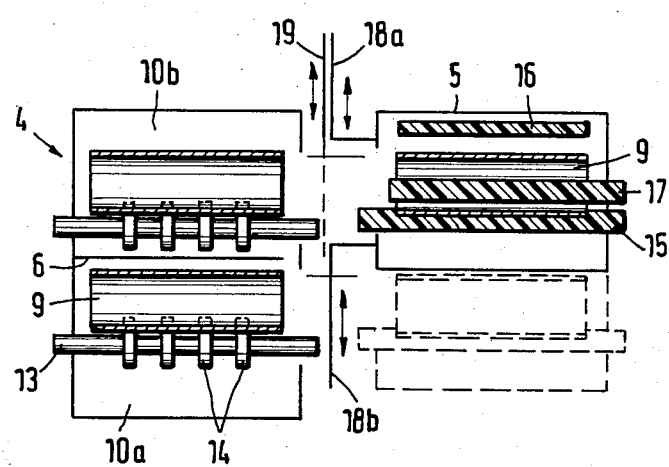
FIG. 3 shows a cross-section along the line B—B of FIG. 1 of the chamber with the highest temperature (sintering chamber) and the two directly preceding and following chambers.

The chamber 5 has a driven pair of rolls 15, which support the pipes 9 and set them in self-rotation. In the chamber 5, the pipes are heated up by means of a roof heating element 16 and a heating element 17 protruding axially into the pipes 9. The chamber 5 is lowerable from an upper position, shown by solid lines in FIG. 3, into a lower position, shown by broken lines. Held against chamber 5 are closures 18a, 18b which face the exit and entrance of subchambers 4a, 4b and can be used to shut off the exit and entrance of subchambers 4a, 4b alternately, depending on the position of chamber 5. A slide plate 19 can be used to seal off the entrance and exit of chamber 5.

With the heating device 16 and 17, it is possible to heat up the pipes during their self-rotation from the low initial temperature upon transfer to the desired high sintering temperature. After this heating up, the heating device can be switched off and the atmosphere in the chamber lowered to the temperature corresponding to the temperature at the start of the following chamber 4b.

Production of the pipes is performed using the installation described in the following manner:

The hollow strands formed by the extruder 1 are cut to length, accurately dimensioned and straightened in the cutting, shaping and straightening unit. The pipes 9 formed in this way are transferred into the upper subchamber of chamber 3 by axial shifting. The transportation device of this chamber supports the pipes on two pairs of circular disks and sets the pipes 9 in rotation. During this rotation, transportation is also performed. The atmosphere of the subchamber is adjusted to a drying temperature. In order that the pipes are not subjected suddenly to a high temperature, the temperature rises during transportation. For this purpose, the pipes are covered on the outside by air conducted in an opposing flow. Control of the air blown inside the pipes can be selected appropriately. At the end of the subchamber, the pipes 9 are again axially shifted and transferred to the corresponding transportation device of the following subchamber 4a. Transportation in this chamber is the same, as is the type of heating, but at higher temeratures. At the end of the subchamber 4a, the pipes are again axially shifted into chamber 5, where they are heated to sintering temperature. Since the initial temperature of chamber 5 is the same as the temperature at the end of chamber 4a, the pipes are not subjected to a damaging temperature jump. However, heating in chamber 5 then takes place very quickly, which is undamaging due to the even heating from outside and inside with simultaneous rotation. After reaching the sintering temperature and subsequent cooling to the temperature prevailing at the start of subchamber 4a, the pipes are axially shifted again and transferred into subchamber 4b, onto the lower side 10a of the transportation device. Cooling takes place in this area, continuously in fact, since here too the pipes are covered with cooled air conducted in an opposing flow. This cooled air comes from the upper subchamber 4a. In this way, heat exchange is obtained between the two subchambers 4a, 4b. In a corresponding manner, the pipes are cooled in the next cooling zone of chamber 3. At the end of chamber 3, the pipes are axially pushed out of the installation.

As the pipes are borne on a circular disks 14 or on cantilever arms, not only is it possible to apply hot air or cooled air well to the outside and inside surfaces, but there is then also adequate space still available for scrap to drop through if the pipes lie very close together, whether because pipes of large diameter are being transported or because the carrying elements are too close together.

It goes without saying that it is possible within the scope of the invention to arrange the successively arranged chambers in a line, in particular chamber 5, and also to design the latter differently, in other words likewise to provide for transportation in this chamber as well instead of just a transfer from one level to the other. Thus, this chamber 5 could also be part of chamber 4. However, in this case special means of sealing would have to be provided, due to the higher temperature.

I claim:

1. A method for heat treating cylindrical bodies, which comprises the steps of positioning the cylindrical bodies parallel to one another, and transporting the parallel bodies through a plurality of successive temperature zones comprising at least a drying zone, a high temperature heating zone and a cooling zone to dry, heat and cool said bodies while being transported, the transporting step being performed while rotating said cylindrical bodies about their individual axes, the rotational velocity of bodies being transported through one zone being independent from their forward velocity and independent from the rotational and forward velocities of other bodies being simultaneously transported through the other temperature zones.

2. The method of claim 1 wherein the temerature of each zone is uniform.

3. The method of claim 1 wherein at least the drying and high temperature heating zones have temperatures gradients which adjust the temperature of the cylindrical bodies to correspond to the temperature of the following zone before making entry into said following zone.

4. The method of claim 3 including the steps of transporting the cylindrical bodies through a preheating zone before and a post cooling zone after transporting through the high temperature heating zone.

5. The method of claim 4 including the step of exchanging heat between the drying and cooling zones and between the preheating and post cooling zones.

6. The method of claim 1 wherein the forward velocity of the bodies being transported through the high temperature heating zone is less than the forward velocity of cylindrical bodies being transported through the other zones.

7. The method of claim 6 wherein the high temperature heating zone is sealed off from the preceding and following zones.

8. The method of claim 7 wherein the treatment zones preceding and following the high temperature heating zone are parallel to one another.

9. The method of claim 1 wherein the bodies being treated in the high temperature heating zone are rotated about their individual axes while forward transport is stopped.

10. The method of claim 1 including the step of heating the cylindrical bodies in the high temperature heating zone to their sintering temperature wherein said bodies are ceramic pipes.

11. An apparatus for heat treating cylindrical bodies, which comprises a plurality of treatment chambers comprising at least a drying chamber, a high temperature heating chamber and a cooling chamber, means for drying, heating and cooling said bodies while being transported through said chambers, and means for transporting through said chambers the cylindrical bodies in a parallel arrangement spaced from one another, said transporting means including means for rotating the cylindrical bodies about their individual axes and means for their forward translation through said chambers, the rate of movement of the rotating means in one chamber being independent from the rate of movement of the forward translation means in said one chamber and independent from the rate of movement of the rotating and forward translation means simultaneously operating in the other chambers.

12. The apparatus of claim 11 wherein the treatment chambers are arranged in line, end-to-end.

13. The apparatus of claim 11 wherein the treatment chambers are mutually offset laterally and the transporting means for the chambers are positioned so they overlap with one another.

14. The apparatus of claim 13 including a preheating chamber for said bodies stationed before and post cooling chamber stationed after the high temperature heating chamber.

15. The apparatus of claim 13 wherein the transporting means comprises a continuous belt of chains with driven support rolls.

16. The apparatus of claim 15 wherein one side of the belt of chains traverses the treatment chamber preceding the high temperature heating chamber and the opposing side of said belt of chains traverses the treatment chamber following said high temperature chamber.

17. The apparatus of claim 16 wherein the high temperature heating chamber includes means for elevating the cylindrical bodies.

18. The apparatus of claim 13 wherein the transporting means comprises a continuous belt of chains with cantilever arms.

19. The apparatus of claim 11 wherein the high temperature heating chamber is dimensionally smaller than the other treatment chambers.

20. A method for heat treating cylindrical bodies, which comprises the steps of positioning the cylindrical bodies in a substantially horizontal arrangement, and transporting the bodies through a plurality of successive temperature zones comprising at least a drying zone, a high temperature heating zone and a cooling zone to dry, heat and cool said bodies while being transported, the transporting step being performed while rotating said cylindrical bodies about their individual axes, the rotational velocity of bodies being transported through one zone being independent from their forward velocity and independent from the rotational and forward velocities of other bodies being simultaneously transported through the other temperature zones.

21. An apparatus for heat treating cylindrical bodies, which comprises a plurality of treatment chambers comprising at least a drying chamber, a high temperature heating chamber and a cooling chamber, means for drying, heating and cooling said bodies while being transported through said chambers, and means for transporting through said chambers the cylindrical bodies in a substantially horizontal arrangement spaced from one another, said transporting means including means for rotating the cylindrical bodies about their individual axes and means for their forward translation through said chambers, the rate of movement of the rotating means in one chamber being independent from the rate of movement of the forward translation means in said one chamber and independent from the rate of movement of the rotating and forward translation means simultaneously operating in the other chambers.

* * * * *